United States Patent Office 2,942,019
Patented June 21, 1960

2,942,019

ORGANOSILICON METHYLIDENEAMINO COMPOUNDS AND PROCESS FOR PRODUCING THE SAME

Ronald M. Pike, Grand Island, and Robert J. Lisanke, Buffalo, N.Y., assignors to Union Carbide Corporation, a corporation of New York No Drawing. Filed Oct. 12, 1956, Ser. No. 615,479

15 Claims. (Cl. 260—448.2)

The present invention relates to organosilicon compounds and to processes for their production. More particularly, this invention is concerned with organosilicon compounds containing among other possible functional groups, a methylideneamino group (i.e.

in which the nitrogen atom is linked to a silicon atom through a polymethylene chain containing at least three carbon atoms, as new compositions of matter. The invention is also concerned with processes for producing said organosilicon compounds and with uses thereof.

The present invention is based, in part, upon our discovery that silicon compounds containing a methylideneamino group (i.e.

in which the nitrogen is linked to a silicon atom through a polymethylene linkage can be produced by the reaction of an organosilicon compound containing the aminoalkysilyl grouping (i.e. a NH$_2$(CH$_2$)$_a$Si≡ grouping wherein $a$ is an integer that has a value of at least 3 and is preferably 3 or 4) within an organic compound containing the carbonyl group

as for example either an aldehyde or a ketone as represented by the following equation:

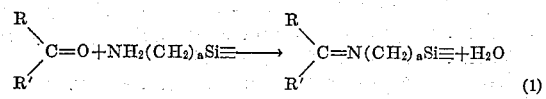
(1)

wherein $a$ has the above-defined meaning and R and R' represent either hydrogen atoms or hydrocarbyl groups such as alkyl groups, alkenyl groups or aryl groups.

According to our studies the reaction represented by Equation 1 is a general one and is applicable to all organosilicon compounds which contain the aminoalkylsilyl grouping depicted above. Suitable for use in our process are the aminoalkylalkoxysilanes and the aminoalkylpolysiloxanes, including copolymeric materials which contain both aminoalkylsiloxane and hydrocarbylsiloxane units. Typical of the aminoalkylalkoxysilanes suitable for use as our organosilicon starting materials are those compounds represented by the structural formula:

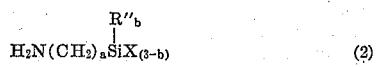
(2)

wherein R" represents an alkyl group such as methyl, ethyl, propyl and butyl and the like, or an aryl group such as phenyl, naphthyl and tolyl and the like, X represents an alkoxy group such as methoxy, ethoxy and propoxy groups and the like, $a$ is an integer having a value of at least 3 and preferably a value of from 3 to 4 and $b$ is an integer having a value of from 0 to 2 and preferably a value of from 0 to 1. Illustrative of such aminoalkylalkoxysilanes are gamma-aminopropyltriethoxysilane,
gamma-aminopropyltripropoxysilane,
gamma-aminopropylmethyldiethoxysilane,
gamma-aminopropylethyldiethoxysilane,
gamma-aminopropylphenyldiethoxysilane,
delta-aminobutyltriethoxysilane,
delta-aminobutylmethyldiethoxysilane,
delta-aminobutylethyldiethoxysilane,
delta-aminobutylphenyldiethoxysilane and the like.

Typical of the aminoalkylpolysiloxanes suitable for use as our organosilicon starting materials are those polysiloxanes which contain the structural unit:

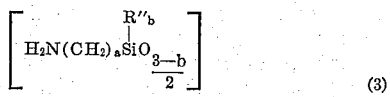
(3)

wherein R", $a$ and $b$ have the same values described above. Such polysiloxanes are prepared by the hydrolysis and condensation of those aminoalkylalkoxysilanes described above or by the cohydrolysis and cocondensation of such aminoalkylalkoxysilanes with other hydrolyzable silanes and can include aminoalkylpolysiloxanes of the trifunctional variety (i.e. where $b=0$), aminoalkylalkylpolysiloxanes and aminoalkylarylpolysiloxanes of the difunctional variety which include cyclic or linear polysiloxanes (i.e. where $b=1$) and linear aminoalkyldialkyldisiloxanes, aminoalkyldiaryldisiloxanes and aminoalkylalkylaryldisiloxanes of the monofunctional variety (i.e. where $b=2$) as well as the mixture of compounds produced by the cohydrolysis of difunctional, trifunctional and monofunctional aminoalkylsilanes.

Suitable starting aminoalkylpolysiloxanes of the trifunctional variety can be more specifically depicted as containing the structural unit:

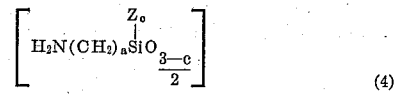
(4)

wherein $a$ has the value previously described, Z represents an hydroxyl and/or alkoxy group and $c$ has an average value of from 0 to 1 or as high as 2 but preferably from 0.1 to 1. Aminoalkylpolysiloxanes of this variety which are essentially free of silicon-bonded alkoxy or hydroxyl groups (i.e. where $c=0$) can be prepared by the complete hydrolysis and complete condensation of aminoalkyltrialkoxysilanes, whereas aminoalkylpolysiloxanes in which Z represents predominantly silicon-bonded alkoxy groups can be prepared by the partial hydrolysis and complete condensation of the same starting silane. On the other hand, aminoalkylpolysiloxanes in which Z represents predominantly silicon-bonded hydroxyl groups can be prepared by the essentially complete hydrolysis and partial condensation of the same aminoalkyltrialkoxysilanes. By way of illustration, a gamma-aminopropylpolysiloxane containing silicon-bonded ethoxy groups can be prepared by hydrolyzing gamma-aminopropyltriethoxysilane with an amount of water insufficient to react with all of the silicon-bonded ethoxy groups present on the starting silane and subsequently condensing the hydrolyzate so formed to produce the desired polymer.

Suitable starting aminoalkylpolysiloxanes of the difunctional variety which include cyclic and linear polysiloxanes can be more specifically defined by the structural formula:

(5)

wherein R" and $a$ have the values previously described and $d$ is an integer having a value of at least 3 and can be as high as 7 for the cyclic aminoalkylpolysiloxanes and higher for the linear aminoalkylpolysiloxanes. Such cyclic and linear aminoalkylpolysiloxanes can be prepared by the hydrolysis and condensation of aminoalkylalkyldialkoxysilanes or aminoalkylaryldialkoxysilanes. In carrying out the hydrolysis and condensation procedures there is produced a product comprising a mixture of cyclic and linear polysiloxanes from which the desired polysiloxane can be recovered. Illustrative of the cyclic aminoalkylsiloxanes suitable for use as the organosilicon starting material in our process are the cyclic tetramer of gamma-aminopropylmethylsiloxane, the cyclic tetramer of delta-aminobutylphenylsiloxane and the like. Illustrative of linear aminoalkylpolysiloxanes suitable for use as the organosilicon starting material in our process are gamma-aminopropylmethylpolysiloxane, gammaa-aminopropylethylpolysiloxane, delta-aminobutylmethylpolysiloxane and the like.

Included among the linear aminoalkylpolysiloxanes suitable for use as the organosilicon starting material in our process are the alkyl, alkoxy and hydroxyl endblocked polysiloxanes which contain from 1 to 3 of such groups bonded to the terminal silicon atoms of the molecules comprising the polymeric chains. Thus we can also employ as our starting materials such linear endblocked aminoalkylpolysiloxanes as monoethoxy endblocked gamma-aminopropylethylpolysiloxane or methyldiethoxysilyl end-blocked delta-aminobutylmethylpolysiloxane or monoethoxydimethylsilyl end-blocked gamma-aminopropylphenylpolysiloxane and the like. The endblocked linear amino-alkylalkylpolysiloxanes and aminoalkylarylpolysiloxanes useful in our process can be prepared by the equilibration of cyclic aminoalkylsiloxanes with silicon compounds containing predominantly siliconbonded alkoxy groups, or by the cohydrolysis and condensation of trialkylalkoxysilanes with aminoalkylalkyldiethoxysilanes or aminoalkylaryldiethoxysilanes. Hydroxyl end-blocked linear polysiloxanes can also be prepared by heating linear or cyclic aminoalkylpolysiloxanes with water.

The copolymeric aminoalkylpolysiloxanes which can be employed as a starting material can be depicted as containing both the structural units;

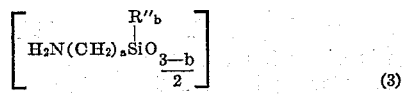

(3)

and

(6)

wherein R″, a and b have the values described above and e is an integer having a value of from 0 to 2. The copolymers suitable for use as the organosilicon starting material in our process can contain various combined siloxane units such as trifunctional aminoalkylsiloxane units (where $b=0$) with trifunctional alkyl-, aryl- or mixed alkyl- and arylsiloxane units (where $e=0$) or with di-functional alkyl-, aryl-, or mixed alkyl- and arylsiloxane units (where $e=1$). These copolymers can also contain various combined siloxane units; difunctional aminoalkylsiloxane units (where $b=1$) with trifunctional alkyl-, aryl- or mixed alkyl- and arylsiloxane units (where $e=0$) or with difunctional alkyl-, aryl- or mixed alkyl- and arylsiloxane units (where $e=1$).

Those copolymers which contain trifunctional amino alkylsiloxane units and other siloxane units are preferably prepared by the cohydrolysis and cocondensation of the corresponding alkoxysilane starting materials. Such copolymers can contain silicon-bonded alkoxy and/or hydroxyl groups or they can comprise essentially completely condensed materials. The linear and cyclic copolymeric siloxanes are preferably prepared by the separate hydrolysis and condensation of an aminoalkylalkyldialkoxysilane or aminoalkylaryldialkoxysilane and the dialkyldialkoxysilane or diaryldialkoxysilane to cyclic aminoalkylsiloxanes and cyclic dialkylsiloxanes or diarylsiloxanes and subsequently equilibrating mixtures of such cyclic siloxanes to linear copolymers. Such linear copolymers can also contain chain-terminating or end-blocking groups such as alkyl, alkoxy or hydroxyl groups.

The aminoalkylalkoxysilanes and aminoalkylpolysiloxanes as well as copolymers containing aminoalkylsiloxane and hydrocarbylsiloxane units are all disclosed and claimed as new compositions of matter in copending U.S. applications Serial Nos. 615,466, 615,507, 615,483 and 615,481, the latter two now abandoned, filed concurrently herewith. Processes for producing such compounds are also disclosed and claimed in said copending applications.

The organic compounds containing the carbonyl group that are useful as starting materials in producing the compositions of this invention are aldehydes and ketones. Typical of the aldehydes and ketones suitable for use as starting materials in producing the compounds of my invention are those that are represented by the structural formula:

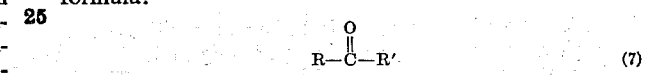

(7)

wherein R and R' represent either hydrogen atoms or hydrocarbyl groups such as alkyl, aryl, alkenyl and the like. Illustrative of the hydrocarbyl groups which R and R' can represent include methyl, ethyl, propyl, isopropyl, butyl, allyl, vinyl, crotonyl, phenyl, tolyl, naphthyl, xylyl, mesityl and the like. Such hydrocarbyl groups can be substituted or unsubstituted and, when substituted, the substituents can be nitro groups, halogen atoms, hydroxyl groups, alkoxy groups and the like. Typical of the compounds suitable for use in our process which are represented by the above formula are such aldehydes as formaldehyde, acetaldehyde, butyraldehyde, 2-ethylbutyraldehyde, n-octylaldehyde, acrolein, crotonaldehyde, methacrolein 2-ethyl-3-propylacrolein, benzaldehyde, tolualdehyde, and the like, and such ketones as acetone, methylisobutylketone, methylethylketone, ethylbutylketone, methylvinylketone, allylisobutylketone, isophorone, mesityloxide, acetophenone, isobutylphenylketone, dypnone and the like.

We can also employ such substituted aldehydes as omega-nitrobutyraldehyde, 4-chloro-2-ethylbutyraldehyde, salicylaldehyde, anisaldehyde, 4,4'-dihydroxybenzophenone, p-nitroacetophenone and the like.

The process of our invention can be carried out by forming a mixture of an organosilicon compound containing the aminoalkylsilyl grouping depicted above with one of our organic carbonyl-containing compounds and maintaining the mixture at a temperature at which the organosilicon compound and the aldehyde or ketone react. There results or is produced, an organosilicon compound containing a methylideneamino group linked to a silicon atom through a polymethylene chain containing at least three carbon atoms and water.

The relative amounts of the organosilicon compounds containing the aminoalkylsilyl grouping and the organic carbonyl-containing compounds used as starting materials in our process are not narrowly critical. We can employ for each gram atom of nitrogen present in the starting organosilicon compound from 1 to 40 chemical equivalents (based on the carbonyl group) of the starting organic carbonyl-containing compound. However, we prefer to employ for each gram atom of nitrogen present in the starting organosilicon compound from 1 to 2 chemical equivalents (based on the carbonyl group) of the starting organic carbonyl-containing compound. Relative amounts of the starting materials other than those described can be employed; however, no commensurate advantage is gained thereby.

The reaction between our starting compounds can be carried out at temperatures which are not narrowly critical and which can vary over a wide range. We can employ temperatures of from as low as 0° C. to temperatures as high as 250° C.; however, we prefer to conduct the reaction at temperatures of from about 5° C. to about 150° C. Other temperatures may be used but no commensurate advantage is gained thereby. At temperatures below about 5° C., the rate of the reaction is extremely slow and at temperatures above 250° C. undesirable side reactions tend to occur.

The reaction between organosilicon compounds containing the aminoalkylsilyl grouping and the aldehydes or ketones is preferably carried out within a liquid organic compound in which the starting materials are mutually soluble and which is non-reactive therewith.

When aminoalkylalkoxysilanes are used as the organosilicon starting materials in producing the compositions of this invention, the liquid organic compound within which the reaction can be carried out is preferably a compound that is miscible with water. The use of liquid organic compounds that dissolve the aminoalkylalkoxysilane and aldehyde or ketone starting materials and that are miscible with water was found to minimize the hydrolysis of the alkoxy groups of the aminoalkylalkoxysilane starting material by the water produced in the reaction of the aminoalkylalkoxysilane and the aldehyde or ketone. Illustrative of such liquid organic compound are the cyclic ethers such as tetrahydrofuran and compounds that are represented by the formula $R'''O(CH_2CH_2O)_xH$ and wherein $R'''$ is an alkyl group that contains from 1 to 6 carbon atoms and $x$ is an integer that has a value of from 1 to 2.

When aminoalkylpolysiloxanes are used as the starting organosilicon material in producing the compounds of this invention, the liquid organic compound within which the reaction can be carried out is preferably one that is not miscible with water, although the cyclic ethers and oxyalkylene compounds described above can also be employed. Liquid organic compounds of the latter type are particularly useful in separating water from the reaction mixture. Illustrative of the liquid organic compounds which can be employed when our starting aminoalkyl silicon compounds are aminoalkylpolysiloxanes are petroleum ether and aromatic hydrocarbons such as benzene, toluene and xylene.

The amount of the liquid organic compound, within which the reaction can be carried out, is not narrowly critical. We can employ such liquid organic compounds in amounts of from about 10 parts to about 400 parts by weight per 100 parts by weight of the organosilicon and aldehyde or ketone starting materials. Amounts of such liquid organic compounds of from 20 parts to 100 parts by weight per 100 parts by weight of the organosilicon and aldehyde or ketone starting materials are preferred in conducting the reaction. Amounts of these liquid organic compounds other than those described above may be used; however, no commensurate advantage is gained thereby.

As described above, one of the products formed by the reaction between an organosilicon compound containing the aminoalkylsilyl grouping and an aldehyde or ketone is water. This water is preferably removed from the reaction mixture by adding thereto a liquid organic compound of the above-described type that not only dissolves the starting materials but also forms an azeotrope with water and heating the reaction mixture to a temperature sufficiently elevated to volatilize the azeotrope. The volatilized azeotrope may be condensed, the condensate freed of water to produce the anhydrous liquid organic compound and the anhydrous liquid organic compound may be returned to the reaction mixture. Alternately the water may be removed from the reaction mixture by heating the reaction mixture to a temperature sufficiently elevated to remove the water or by adding a hydrophilic absorbent or adsorbent to the reaction mixture.

The compounds of this invention are organosilicon compounds that contain a methylideneamino group in which the nitrogen atom is attached to a silicon atom through a polymethylene chain containing at least three carbon atoms. As used herein the methylideneamino group is the group that is represented by the structural formula

wherein the carbon atom is a carbon atom of a methylidene group or a substituted methylidene group such as a phenylmethylidene (or benzal) group, a diphenylmethylidene group, a vinylmethylidene (or allylidene) group, an ethylmethylidene (or propylidene) group and the like. The compounds of this invention contain the methylideneaminoalkylsilyl grouping which may be represented by the structural formula:

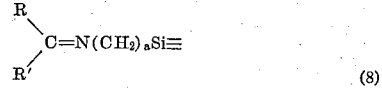

wherein R, R' and $a$ have the above-described meanings.

The compounds of this invention that are produced from the aminoalkylalkoxysilanes that are represented by structural Formula 2 and the aldehydes and ketones represented by Formula 7 are methylideneaminoalkylalkoxysilanes that may be represented by the structural formula:

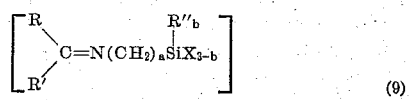

wherein R, R', $a$, R", X and $b$ have the above-described meanings. Illustrative of these methylideneaminoalkylsilanes are methylideneaminopropyltriethoxysilane, phenylmethylideneaminobutylmethyldiethoxysilane, ethylmethylideneaminobutyldimethylethoxysilane and the like.

The compounds of this invention that are produced from the aminoalkylpolysiloxanes that contain the structural units represented by structural Formula 3 and the aldehydes and ketones represented by Formula 7 are methylideneaminoalkylpolysiloxanes that contain the structural unit that may be represented by the structural formula:

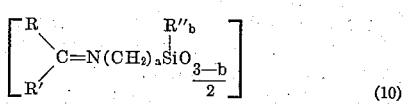

wherein R, R', $a$, R" and $b$ have the above-described meanings. Illustrative of these units are the methylideneaminopropylsiloxy unit, the methylethylideneaminobutylmethylsiloxy unit, the phenylmethylideneaminobutyldimethylsiloxy unit and the like.

The compounds of this invention that are produced from the aminoalkylpolysiloxanes that contain the structural unit represented by structural Formula 4 and the aldehydes and ketones represented by Formula 7 are methylideneaminoalkylpolysiloxanes that contain the structural unit that may be represented by the structural formula:

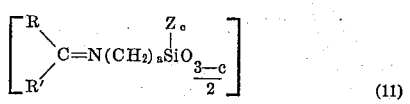

wherein R, R', $a$, Z and $c$ have the above-described meanings. Illustrative of these units are the methylideneaminopropylhydroxysiloxy unit, the methylideneaminobutylhydroxysiloxy unit, the phenylmethylideneaminobutylethoxyphenylsiloxy unit and the like.

The compounds of this invention that are produced from the copolymeric aminoalkylpolysiloxanes that contain the structural units represented by structural Formulae 3 and 6 and the aldehydes and ketones represented by Formula 7 are copolymeric methylideneaminoalkylpolysiloxanes that contain the structural units represented by structural Formulae 6 and 10.

The compounds of this invention are particularly useful as sunscreen agents as well as ultra violet absorbing agents and as chelating agents. Our compounds also find use as additives for known silicone products. By way of illustration the difunctional methylideneaminoalkylsiloxanes can be either added to or equilibrated with dimethylpolysiloxanes to form modified oils or gums. The trifunctional methylideneaminoalkylsiloxanes and substituted methylideneaminoalkylsiloxanes can be employed themselves as thermosetting resins or they can be added to methylphenylpolysiloxanes of the thermosetting type as modifiers to improve the color stability thereof. Such thermosetting resins find use as coating materials. In addition, the methylideneaminoalkylalkoxysilanes of this invention may be physically mixed or equilibrated with silicone elastomers before curing to improve the properties of the cured and post-cured elastomer.

The following examples illustrate my invention.

*Example I*

A solution containing 66.3 grams (0.3 mole) of gamma-aminopropyltriethoxysilane and 400 ml. of benzene was formed in a one-liter, round-bottomed, three-necked flask. The flask was equipped with a Dean-Stark trap, a reflux condenser, a magnetic stirrer and an additional funnel. The contents of the flask were stirred and heated to reflux by means of a heating mantle, and in a dropwise fashion, a solution of 39.6 grams (0.3 mole) of cinnamaldehyde dissolved in 350 ml. benzene were added to the flask from the addition funnel over a period of three hours at a temperature between 80–110° C. At the onset of the addition, water was collected in the Dean-Stark trap. Some highly colored yellow-orange solid also formed in the flask and the liquid phase of the reaction mixture turned to an intense dark amber color. The reaction mixture was allowed to reflux two additional hours and 5.3 milliliters of water were collected as compared to the 5.4 milliliters of water that would have been produced had the reaction of the aldehyde and the silanes gone to completion and/or had the water produced been quantitatively recovered.

After the mixture in the flask had cooled to room temperature it was filtered to remove the suspended solid. The orange colored solid so separated was washed with 100 milliliters of benzene, filtered and dried in vacuo over anhydrous calcium chloride. The dry weight of the solid was 8.9 grams. The filtrates were combined and evaporated to dryness by distillation in two stages. First benzene and the other volatiles were removed at atmospheric pressure and at a head temperature of 84° C., and then the residue so obtained was heated at a maximum temperature of 175° C. at 1.0 mm. Hg for 45 minutes. There were obtained 92.3 grams (92% yield of styrylmethylideneaminopropyltriethoxysilane i.e. cinnamylideneaminopropyltriethoxysilane, having the structure: $C_6H_5CH=CH-CH=N-(CH_2)_3Si(OC_2H_5)_3$) of a dark amber liquid with the following physical properties: $n_D^{25}=1.5056$, viscosity at 25° C.=170 centipoises.

*Analysis of the dark amber liquid.*—Calculated for $$C_6H_5CH=CH-CH=N-(CH_2)_3Si(OC_2H_5)_3$$

(percent by wt.): C, 64.5; H, 8.8; N, 4.2; O, 14.4; and Si, 8.5. Found (percent by wt.): C, 61.7; H, 8.8; N, 4.1; O (by difference), 15.5; and Si, 9.9.

The infra-red absorption of the dark amber liquid at 1608 cm.$^{-1}$ indicated the C=C (phenyl) group, at 1640 cm.$^{-1}$ indicated the C=C (alkenyl) group, at 1678 cm.$^{-1}$ indicated the C=N group and at 1100 and 1075 cm.$^{-1}$ indicated the SiOEt group. The spectra of the colored solid (the corresponding polysiloxane) exhibited intense absorption at 1130 cm.$^{-1}$ indicating the $SiO_{1.5}$ group, at 1608 cm.$^{-1}$ indicating the C=C (phenyl) group and at 1630 cm.$^{-1}$ indicating the C=C (alkenyl) group. The spectra of the colored solid exhibited absorption of medium intensity at 1670 cm.$^{-1}$ indicating the C=N group.

*Example II*

In a 500 ml. three-necked, round-bottomed flask were placed 57.2 grams (0.3 mole) of gamma-aminopropylmethyldiethoxysilane and 50 ml. of tetrahydrofuran. The flask was equipped with addition funnel, magnetic stirrer and thermometer that extended into the liquid phase. While the contents of the flask were being stirred, 36.7 grams (0.3 mole) of freshly distilled salicylaldehyde dissolved in 50 ml. tetrahydrofuran were added dropwise to the flask. No solid of any kind was observed (i.e. no polysiloxane formed) in the flask on addition of the aldehyde solution to the flask. The temperature of the contents of the flask rose from 28.5° C. to 50° C. during the first 25 minutes of the dropwise addition and an ice bath was employed to keep the temperature from rising above 50° C. The total time of addition of the aldehyde solution was 1.5 hours. The contents of the flask were stirred for 2.0 hours at room temperature and then evaporated to dryness in vacuo for 1.5 hours at a maximum pot temperature of 175° C., a maximum reduced pressure of 1.0 mm. Hg, a maximum head temperature of 35° C., and a maximum mantle temperature of 250–275° C. There were obtained as a residue 84.2 grams (95% yield of 2-hydroxyphenylmethylideneaminopropylmethyldiethoxysilane i.e.

$$HOC_6H_4CH=N(CH_2)_3Si(CH_3)(OC_2H_5)_2)$$

of a dark amber colored oil with the following physical properties: $n_D^{25}=1.5404$ and viscosity at 25° C.=485 centipoises.

*Analysis of the dark amber colored oil.*—Calculated for

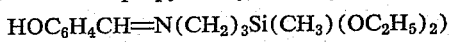

(percent by wt.): C, 60.9; H, 8.5; N, 4.8; O, 16.3 and Si, 9.5. Found (percent by wt.): C, 60.1; H, 7.4; N, 4.8; O (by difference), 16.7 and Si, 11.0.

Infra-red spectra of this material exhibited strong absorption bands at 1680 cm.$^{-1}$ indicating the C=N group, at 1600 cm.$^{-1}$ indicating the C=C (phenyl) group, at 1258 cm.$^{-1}$ indicating the $SiCH_3$ group, at 1100 and 1075 cm.$^{-1}$ indicating the $SiOC_2H_5$ group. A very broad band head in 3–4 micron region characteristic of hydrogen bonded type structure was obtained.

*Example III*

In a 500 ml. three-necked round-bottomed flask, equipped with a reflux condenser, magnetic stirrer, addition funnel and thermometer were placed 66.5 grams (0.3 mole) of gamma-aminoproplytriethoxysilane dissolved in 50 ml. of butyl carbitol. The addition funnel was charged with 24.2 grams (0.3 mole) of formaldehyde (37% by weight, aqueous) dissolved in 50 ml. of butyl carbitol $[C_4H_9O(C_2H_4O)_2H]$. The aldehyde solution was added dropwise and stirring and external cooling supplied so that the reaction mixture did not rise above 40° C. The addition was completed in 1.5 hours. Stirring was maintained at a temperature of 75° C. for an additional 2.0 hours. The reaction mixture was chilled to room temperature and then distilled in vacuo in a column equipped with a dry ice trap to produce the following fractions:

| Fraction | Wt. (g.) | Head Temp. (° C.) | Pressure (mm. Hg) | $n_D^{25}$ |
|---|---|---|---|---|
| 1 | 8.5 | 29–107 | 44 | 1.3385 |
| 2 | 41.7 | 96–113 | 21 | 1.4297 |
| 3 | 48.3 | 06–100 | 18 | 1.4300 |
| 4 | 4.8 | 108 | 16 | 1.4300 |
| 5 | 11.2 | 108 | 16 | 1.4306 |
| 6 | 5.5 | 108–116 | 16 | 1.4339 |
| Residue (7) | 62.8 | | | 1.4498 |

The distillation was discontinued when the temperature rose sharply to 116° C. (fraction 6) and some decomposition (vapors in Dry Ice trap) were observed. The residue (fraction 7) was a water clear liquid [i.e. methylideneaminopropyltriethoxysilane, $$CH_2=N(CH_2)_3Si(OC_2H_5)_3]$$

that had the following physical properties: $n_D^{25}=1.4498$ and a viscosity at 25° C. of 380 centipoises.

*Analysis of the residue.*—Calculated for $$CH_2=N-(CH_2)_3Si(OC_2H_5)_3$$

(percent by wt.): N, 6.0; Si, 12.0; and $OC_2H_5$, 57.7. Found (percent by wt.): N, 6.0; Si, 12.0 and $OC_2H_5$, 49.6.

The infra-red spectra absorption of the residue at 1100 and 1075 cm.$^{-1}$ indicated the $SiOC_2H_5$ group and at 1680 cm.$^{-1}$ indicated the C=N group. There was no evidence of $NH_2$ or COH groups in spectra.

Example IV

In a single-necked 500 ml. round-bottomed flask were placed 28.6 grams (0.15 mole) of gamma-aminopropylmethyldiethoxysilane and 100 ml. toluene were then added. Thirty-five and one-tenth grams (0.15 mole) of dibenzalacetone were dissolved in 100 ml. tetrahydrofuran and this solution was cautiously added, with stirring, in 25 ml. increments of the solution to the flask. The temperature of the flask rose from 25.0° C. to 28.5° C. due to the addition of the solution. A double weight soxhlet thimble was filled with 20 grams anhydrous calcium sulfate and placed in the soxhlet apparatus. The reaction mixture heated to reflux for 3.0 hours at a temperature between 100 to 150° C. The flask was cooled to room temperature, the soxhlet thimble was replenished with anhydrous calcium sulfate and the contents were refluxed for an additional three hours. Upon refluxing, the reaction mixture became intensely colored. The solution changed from a light yellow to a deep amber coloration over this period. The solution was then concentrated to dryness for 1.25 hours at maximum temperature of 90–115° C., and maximum reduced pressure of 1.0 mm. Hg. There were obtained 40.1 grams of an intensely colored dark amber oil. This oil was triturated twice with 350 ml. portions of petroleum ether to separate the unreacted dibenzalacetone from the substituted methylidenealkylsilyl product. The petroleum ether fractions were decanted, combined and dried by first heating at atmospheric pressure to remove the petroleum ether and then in vacuum. The conditions during the drying were a maximum reduced pressure of 1.0 mm. Hg, a maximum temperature on flask wall of 120° C. and a duration of 0.5 hour. A dark viscous oil (28.0 grams, 47% yield of distyrylmethylideneaminopropylmethyldiethoxysilane, $$(C_6H_5CH=CH)_2C=N(CH_2)_3Si(CH_3)(OC_2H_5)_2)$$

with $n_D^{25}$ 1.5569 was obtained.

*Analysis of the dark viscous oil.*—Calculated for $$(C_6H_5CH=CH)_2C=N-(CH_2)_3Si(CH_3)(OC_2H_5)_2$$

(percent by wt.): N, 3.4; and Si, 6.9. Found (percent by wt.): N, 2.7; and Si, 7.1.

The infra-red spectra of the product exhibited strong absorption bands at; 1588 cm.$^{-1}$ indicating the presence of C=C (phenyl) group, at 1630 cm.$^{-1}$ indicating the presence of a C=C (alkenyl) group, at 1680 cm.$^{-1}$ indicating the presence of a C=N group; at 1255 cm.$^{-1}$ indicating the presence of an $SiCH_3$ group and at 1100 and 1075 cm.$^{-1}$ indicating the presence of an $SiOC_2H_5$ group.

Example V

In a 500 ml. round-bottomed flask were placed 66.3 grams (0.3 mole) of gamma-aminopropyltriethoxysilane and 175.0 grams (3.0 moles) of acetone. The flask was attached to a Soxhlet apparatus and a double weighted thimble filled with 20 grams of calcium sulfate was placed in the flask. The contents of the flask formed a solution that was refluxed for 3.0 hours and very slight change in color of solution was observed during the refluxing. The solution was chilled to room temperature. Twenty grams of a hydrophilic absorbent were added to the flask and there was observed a pronounced color change over an additional 3.0 hours refluxing between the temperatures of 55 to 90° C. The solution had a definite yellow coloration typical of most substituted methylidene amino derivatives. An additional 20 grams of a hydrophilic absorbent were added and the yellow solution was refluxed an additional 2.0 hours. The solution did not further change color or shade during the refluxing. The solution was then evaporated to dryness at a maximum reduced pressure of 1.0 mm. Hg and a maximum pot temperature of 120° C. for about 2.5 hours. There were obtained 72.7 grams (93% yield of dimethylmethylideneaminopropyltriethoxysilane, (isopropylideneaminopropyltriethoxysilane), $(CH_3)_2C=N(CH_2)_3Si(OC_2H_5)_3)$ of a light yellow liquid with the following physical properties: $n_D^{25}=1.4387$ and a viscosity at 25° C. of 13 centipoises.

*Analysis of the product.*—Calculated for $$(CH_3)_2C=N-(CH_2)_3Si(OC_2H_5)_3$$

(percent by wt.): N, 5.4; and Si, 10.9. Found: N, 4.8 and Si, 11.8.

The infra-red spectra of the product exhibited strong absorption bands at 1668 cm.$^{-1}$ indicating the presence of a C=N group and at 1100 and 1075 cm.$^{-1}$ indicating the presence of an $SiOCH_2H_5$ group.

Example VI

In a three-necked 250 ml. round-bottomed flask equipped with addition funnel, magnetic stirrer and thermometer were placed 82.5 grams (0.1 mole) of a delta-aminobutylmethyl-modified dimethylsilicone oil that had a molecular weight of 1156, that contained 10% by weight of combined delta-aminobutylmethylsiloxane units and that had the structure $$(CH_3)_3SiO[(CH_3)_2SiO]_{13}[CH_3SiO(CH_2)_4NH_2]Si(CH_3)_3$$

The addition funnel was charged with 10.6 grams (0.1 mole) of benzaldehyde and the reaction vessel placed in an ice bath. The oil was stirred and chilled to 0–5° C. and the aldehyde added dropwise over 0.5 hour. The oil became cloudy on addition of the aldehyde. The mixture was stirred for 2.0 hours more and allowed to warm up to room temperature. Ten grams anhydrous potassium hydroxide were added to the mixture which was then allowed to stand at 0–5° C. for 18 hours. A clear light yellow colored oil formed. The oil was decanted into a single-necked 100 ml. round-bottomed flask. The unreacted benzaldehyde and other volatiles were distilled from the decanted liquor in vacuo at 1.0 mm. Hg. The main forerun came off at 40° C. with a total of 6 ml. volatile collected. The distillation was conducted over 0.3 gram anhydrous potassium hydroxide. The distillation was discontinued when head temperature rose sharply over 40° C. The residue was chilled to room temperature and then the oil was filtered through glass wool into a tared flask. There were obtained 63.3 grams (73% yield of a copolymer containing phenylmethylideneaminobutylmethylsiloxane units, dimethylsiloxane units and trimethylsiloxane units, i.e.

$$(CH_3)_3SiO[(CH_3)_2SiO]_{13}[CH_3SiO(CH_2)_4N=CHC_6H_5]Si(CH_3)_3$$

of a light yellow oil with the following physical properties: $n_D^{25}=1.4250$, $d_4^{20}=0.944$ g./ml., a viscosity of 22.7 centistokes at 25° C., E maximum, 18,400 and lambda maximum 2480A. (See F. Daniels et al., "Experimental Physical Chemistry" McGraw-Hill Publishing Co., New York, New York (1949), Fourth Edition, page 22.)

*Analysis of the yellow oil.*—Calculated for

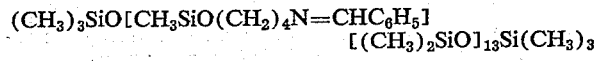

(percent by wt.): C, 41.7; H, 8.3; N, 1.0; Si, 32.6 and M.W. 1378. Found (percent by wt.): C, 40.1; H, 9.7; N, 0.8; Si, 32.7 and M.W. 1364.

Infra-red analysis of the yellow oil showed absorption at 1640, 800, 845 and 755 cm.$^{-1}$ characteristic of dimethylsilicone oil with incorporated C=N function. There was also observed C=C groups at 1590 cm.$^{-1}$ due to presence of the phenyl group.

Example VII

In a 500 ml. 3-necked round-bottomed flask equipped with reflux condenser, magnetic stirrer, addition funnel and thermometer were placed 70.9 grams (0.3 mole) of delta-aminobutyltriethoxysilane dissolved in 100 ml. of tetrahydrofuran. The addition funnel was charged with 38.4 grams (10.3 mole) freshly distilled octylaldehyde. The aldehyde was added through the addition funnel in a dropwise fashion, while stirring the reaction mixture, over a period of one hour and the 3-necked flask cooled so that the temperature of the reaction mixture did not rise above 5° C. No precipitation occurred during the addition of octylaldehyde to the solution of delta-aminobutyltriethoxysilane. The reaction mixture was stirred for an additional two hours during which time the temperature of the mixture was allowed to rise to room temperature. While stirring the solution 10 grams of anhydrous sodium acetate was cautiously added after which the reaction mixture was kept at a temperature of 0° C. for a period of 18 hours. The reaction mixture was then filtered through a glass sintered funnel and a clear like amber filtrate obtained. The filtrate was then distilled in vacuum through a column equipped with a Dry Ice trap and the following fractions were obtained:

| Fraction | Wt. (g.) | Head Temp. (° C.) | Pressure (mm. Hg) | $n_D^{25}$ |
|---|---|---|---|---|
| 1 | 15.4 | 110–134 | 0.6 | 1.4255 |
| 2 | 16.0 | 134–143.5 | 0.6 | 1.4285 |
| 3 | 56.7 | 143.5–166 | 0.6 | 1.4358 |
| 4 | 15.1 | 166–174 | 0.6 | 1.4412 |
| 5 | 29.4 | 174 | 0.6 | 1.4688 |

The distillation was discontinued when the temperature rose sharply to 174° C. (fraction 4) at which time some decomposition apparently occurred (vapors were noted in the Dry Ice trap). The product (fraction 3) octylideneaminobutyltriethoxysilane (n-heptylmethylideneaminobutyltriethoxysilane) having the structure

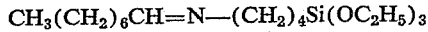

is a water clear liquid having the following physical properties: $n_D^{25}=1.4358$.

*Analysis of the product.*—Calculated for

(percent by wt.): C, 62.7; H, 11.3; N, 4.1; O, 13.9; Si, 8.1 and M.W. 345. Found (percent by wt.): C, 62.5; H, 13.2; N, 3.4; O (by difference), 12.7; Si, 8.2; and M.W. 361.

Infra-red analysis of the product showed strong absorption bands at 1675 cm.$^{-1}$ characteristic of the functional C=N group, and also strong absorption bands at 1100 and 1075 cm.$^{-1}$ characteristic of SiOC$_2$H$_5$ group.

Example VIII

A benzene solution containing salicylideneaminopropylmethyldiethoxysilane was heated with a weighed portion of hydrated silica gel. One gram of the silane became bonded to each 40 grams of the silica. After removal of the benzene liquor, followed by washing with acetone and later water, a copper acetate solution was passed over the coated gel. The coated gel removed 61 wt. percent or 5.7 meq. copper ion from the solution before breaking through. The capacity of this mixture was calculated as 0.14 meq./g. of resin. Each gram of this silane was thereby found to chelate 0.36 gram of Cu ion.

Example IX

An 18 wt. percent chloroform solution of distyrylmethylideneaminopropylmethyldiethoxysilane $$(C_6H_5CH=CH)_2C=N(CH_2)_3Si(CH_3)(OC_2H_5)_2$$

was used to coat glass slides. The coatings were cured (10 minutes at 128° C.) to produce a hard film (4 microns in thickness) (the coating became bonded to the glass via Si—O to SiO linkages). To test the permanency of the coatings to washing, they were washed in a hot (85° C.) saturated solution of trisodium phosphate after which they were air dried and tested for ultra-violet absorption. It was found that the coating was sufficient to absorb 97% of ultra-violet radiation emitting at a frequency of 2900–3000 A. For purposes of comparison, a commercial ultra-violet absorber (phenyl alpha-methylstyryl ketone) having essentially the same capacity to absorb ultra-violet radiation of the same frequency was coated on glass slides and found to constitute a non-permanent film on the glass and could be readily removed.

Example X

A silicone compound was formed containing 0.5 part by weight of styrylmethylideneaminopropyltriethoxysilane [i.e. C$_6$H$_5$CH=CH—CH=N(CH$_2$)$_3$Si(OC$_2$H$_5$)$_3$] and 99.5 parts by weight of a silicone gum that comprised combined dimethylsiloxane units and 40 parts of finely divided silica by milling the components on a roll mill. The mixture was cured to an elastomer at 340° F. for 20 minutes, and post-cured for 24 hours at 480° F. The tear strength and elongation properties of the elastomer were improved over similar properties of the same elastomer free of styrylmethylideneaminobutyltriethoxysilane.

Example XI

A silicone compound was formed containing 0.5 part by weight of heptylmethylideneaminobutyltriethoxysilane,  99.5 parts by weight of a silicone gum that comprises combined dimethylsiloxane units and 40 parts of finely divided silica by milling the components on a roll mill. The mixture was cured to an elastomer at 340° F. for 20 minutes, and was post-cured for 24 hours at 480° F. The tear strength and hardness properties of the elastomer were improved over similar properties of the same elastomer free of heptylmethylideneaminobutyltriethoxysilane.

Example XII

A silicone compound was formed containing 0.5 part by weight of 2-hydroxyphenylmethylideneaminopropylmethyldiethoxysilane

and 99.5 parts by weight of a silicone gum that comprised combined dimethylsiloxane units and 40 parts of finely divided silica by milling the components on a roll mill. The mixture was cured to an elastomer at 340° F. for 20 minutes and post-cured by heating it at 480° F. for 24 hours. The tensile strength, elongation and tear strength properties of the elastomer were improved over similar properties of the same elastomer free of 2-hydroxyphenylmethylideneaminopropylmethyldiethoxysilane.

In the practice of our invention we can also employ as our starting organic carbonyl-containing compounds, aldehydes and ketones which contain a second carbonyl group. Thus in the general formula above which defines our starting organic carbonyl-containing compounds, either R or R' can represent a group depicted by the structure:

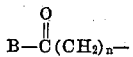

wherein B represents a hydrogen atom or a hydrocarbyl group as described above, as well as ether groups (alkoxy-alkyl) and $n$ is an integer having a value of 1 or 3 and more.

When two carbonyl groups are present in such starting materials and the reaction is conducted in accordance with our process, we can obtain organo-substituted methylideneaminoalkylsilyl compounds in which the organo substituent contains either a carbonyl group or a second methylideneaminoalkylsilyl grouping.

We can also employ as our starting organic carbonyl compounds the cyclic hydrocarbons in which one of the carbon atoms forms part of a carbonyl group as for example cyclohexanone.

What is claimed is:

1. A methylideneaminoalkylsilane represented by the formula:

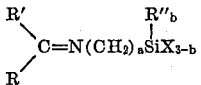

wherein R' and R each is a member from the group consisting of a hydrogen atom, a hydrocarbyl group and a substituted hydrocarbyl group wherein the substituent is a member selected from the group consisting of the halogen atoms and the nitro, hydroxyl and alkoxy groups, R'' is a member from the group consisting of alkyl groups and aryl groups, X is an alkoxy group, $a$ is an integer of at least 3 and $b$ is an integer from 0 to 2 inclusive.

2. A methylideneaminoalkylsiloxane having at least one silicon-bonded methylideneaminoalkyl group represented by the formula:

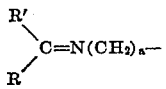

wherein R and R' each is a member from the group consisting of a hydrogen atom, a hydrocarbyl group and a substituted hydrocarbyl group wherein the substituent is a member selected from the group consisting of the halogen atoms and the nitro, hydroxyl and alkoxy groups, and $a$ is an integer of at least 3, each remaining unfilled valence of silicon being satisfied by a member from the class consisting of an alkyl group and an aryl group.

3. A methylideneaminoalkylsiloxane consisting of groups having the formula:

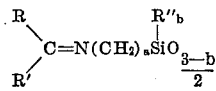

wherein R' and R each is a member from the group consisting of a hydrogen atom, a hydrocarbyl group and a substituted hydrocarbyl group wherein the substituent is a member selected from the group consisting of the halogen atoms and the nitro, hydroxyl and alkoxy groups, R'' is a member from the group consisting of alkyl groups and aryl groups, $a$ is an integer of at least 3 and $b$ is an integer from 0 to 2 inclusive.

4. A methylideneaminoalkylsiloxane consisting of (1) groups having the formula:

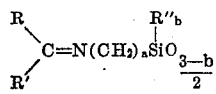

wherein R' and R each is a member from the group consisting of a hydrogen atom, a hydrocarbyl group and a substituted hydrocarbyl group wherein the substituent is a member selected from the group consisting of the halogen atoms and the nitro, hydroxyl and alkoxy groups, R'' is a member from the group consisting of alkyl groups and aryl groups, $a$ is an integer of at least 3 and $b$ is an integer from 0 to 2 inclusive; and (2) groups having the formula:

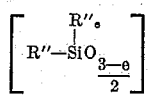

wherein R'' has the above-defined meaning and $e$ is a number having a value from 0 to 2 inclusive.

5. Methylideneaminopropyltriethoxysilane.

6. Cinnamylideneaminopropyltriethoxysilane.

7. 2 - hydroxyphenylmethylideneaminopropyldiethoxysilane.

8. Dimethylmethylideneaminopropyltriethoxysilane.

9. A methylideneaminobutylpolysiloxane.

10. A process for producing an organosilicon compound containing at least one methylideneaminoalkylsilyl group

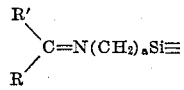

wherein R and R' each is a member from the group consisting of a hydrogen atom, a hydrocarbyl group and a substituted hydrocarbyl group wherein the substituent is a member selected from the group consisting of the halogen atoms and the nitro, hydroxyl and alkoxy groups, and $a$ is an integer of at least 3, said organosilicon compound being selected from the class consisting of silanes having at least one silicon-bonded alkoxy group and siloxanes, each remaining unfilled valence of each silicon atom being satisfied by a member from the class consisting of an alkyl group and an aryl group, which comprises reacting at a temperature from 0° C. to 250° C. a mixture containing (1) an organic carbonyl-containing compound represented by the formula:

wherein R and R' have the above-defined meanings and (2) an organosilicon compound which contains at least one aminoalkyl group represented by the formula:

wherein $a$ is as above-defined, said organosilicon compound which contains said aminoalkyl group being selected from the class consisting of silanes having at least one silicon-bonded alkoxy group and siloxanes, each remaining unfilled valence of each silicon being satisfied by a member from the class consisting of an alkyl group and an aryl group.

11. A process for preparing cinnamylideneaminopropyltriethoxysilane which comprises forming a mixture of cinnamaldehyde and gamma-aminopropyltriethoxysilane and heating the mixture to a temperature of from about 50° C. to about 150° C. to cause said cinnamaldehyde and gamma-aminopropyltriethoxysilane to react to form cinnamylideneaminopropyltriethoxysilane.

12. A process for preparing 2-hydroxyphenylmethylideneaminopropylmethyldiethoxysilane which comprises forming a mixture of salicylaldehyde, gamma-aminopropylmethyldiethoxysilane and tetrahydrofuran at a temperature of from about 0° C. to about 50° C. to cause said salicylaldehyde and gamma-aminopropylmethyldiethoxysilane to react to form 2-hydroxyphenylmethylideneaminopropylmethyldiethoxysilane.

13. A process for producing methylideneaminopropyltriethoxysilane which comprises forming a mixture of formaldehyde, gamma-aminopropyltriethoxysilane in the presence of a solvent and maintaining the mixture at a temperature of from about 5° C. to about 150° C. to cause said formaldehyde and gamma-aminopropyltriethoxysilane to react to form methylideneaminopropyltriethoxysilane.

14. A process for preparing dimethylmethylideneaminopropyltriethoxysilane which comprises forming a mixture of gamma-aminopropyltriethoxysilane and acetone and heating the mixture to a temperature of from about 0° C. to about 50° C. to cause said gamma-aminopropyltriethoxysilane and acetone to react to form dimethylmethylideneaminopropyltriethoxysilane.

15. A process for preparing octylideneaminobutyltriethoxysilane which comprises forming a mixture of delta-aminobutyltriethoxysilane, octylaldehyde, and tetrahydrofuran and heating said mixture at a temperature of from about 5° C. to about 250° C. to cause said delta-aminobutyltriethoxysilane and octylaldehyde to react to produce said octylideneaminobutyltriethoxysilane.

References Cited in the file of this patent

UNITED STATES PATENTS

| | | |
|---|---|---|
| 2,442,196 | Coggeshall | May 25, 1948 |
| 2,610,198 | Sommer | Sept. 9, 1952 |
| 2,736,721 | Dexter | Feb. 28, 1956 |
| 2,762,823 | Speier | Sept. 11, 1956 |